No. 613,950. Patented Nov. 8, 1898.
H. D. WILLIAMS, H. G. HOADLEY & E. C. LEWIS.
LEVER AND RATCH ATTACHMENT.
(Application filed Oct. 27, 1897. Renewed Oct. 5, 1898.)
(No Model.) 3 Sheets—Sheet 1.
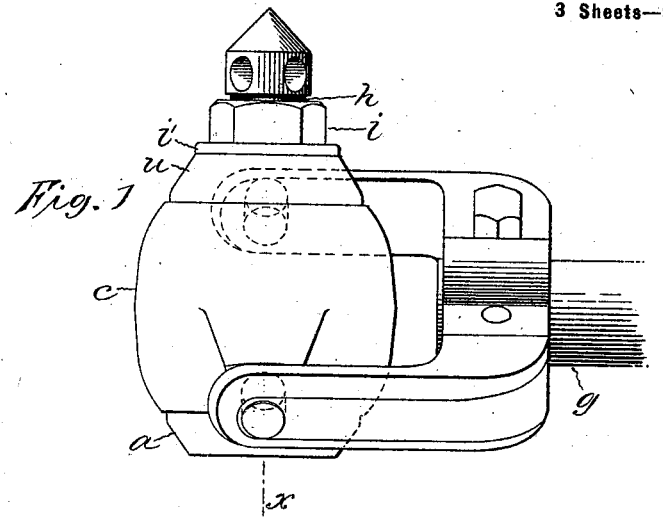
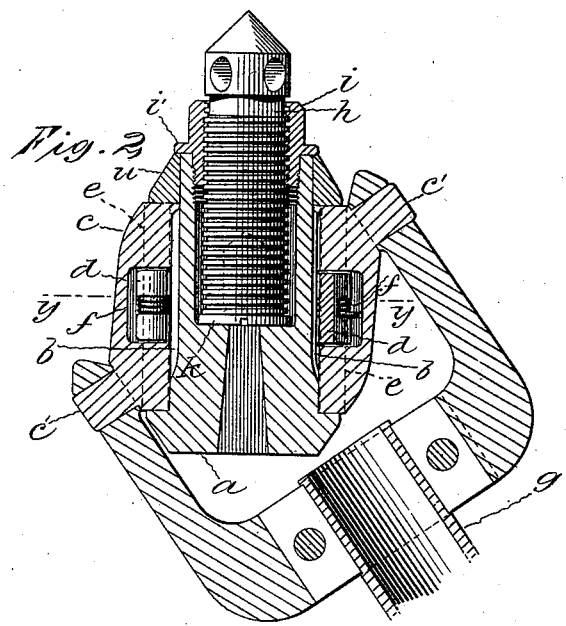
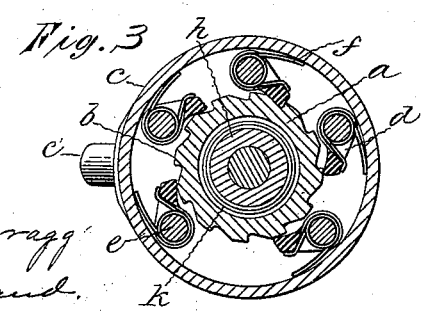

No. 613,950. Patented Nov. 8, 1898.
H. D. WILLIAMS, H. G. HOADLEY & E. C. LEWIS.
LEVER AND RATCH ATTACHMENT.
(Application filed Oct. 27, 1897. Renewed Oct. 5, 1898.)
(No Model.)
3 Sheets—Sheet 2.
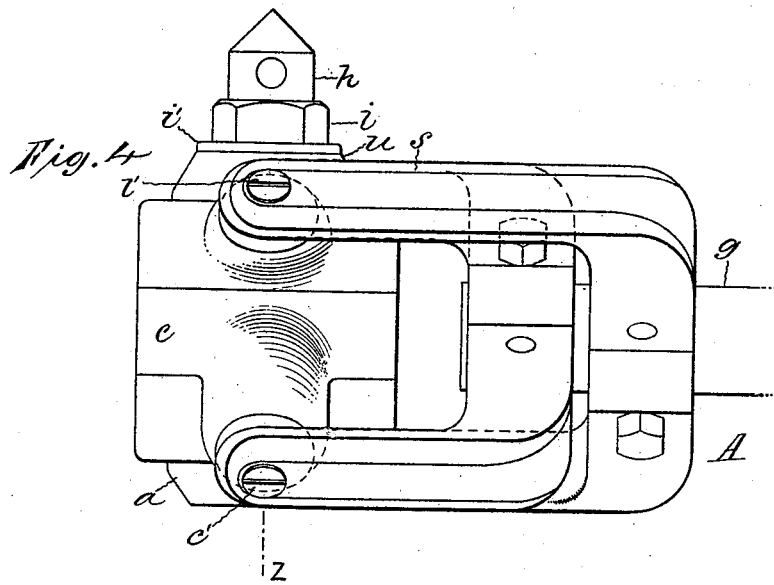
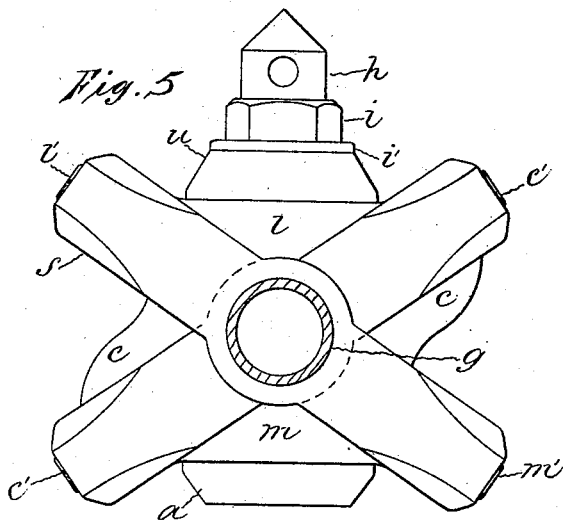
Witnesses
Florence M. Bragg
C. E. Buckland
Inventors
Harry D. Williams
Horace G. Hoadley
Everett C. Lewis
By W. E. Simonds Attorney
THE NORRIS PETERS CO., PHOTO-LITHO., WASHINGTON, D. C.

No. 613,950. Patented Nov. 8, 1898.
H. D. WILLIAMS, H. G. HOADLEY & E. C. LEWIS.
LEVER AND RATCH ATTACHMENT.
(Application filed Oct. 27, 1897. Renewed Oct. 5, 1898.)
(No Model.) 3 Sheets—Sheet 3.
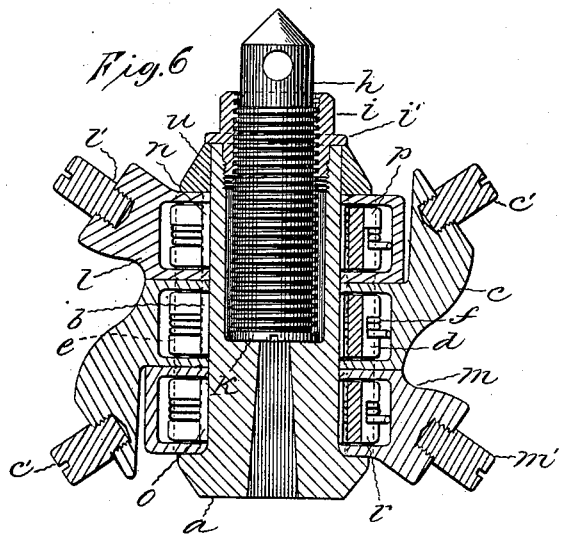
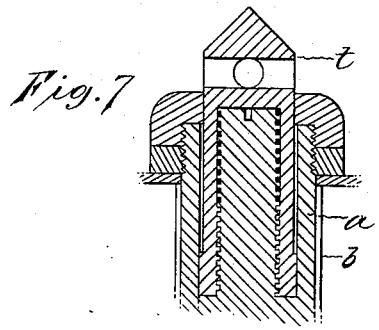
Witnesses Inventors

UNITED STATES PATENT OFFICE.

HARVEY D. WILLIAMS, OF ITHACA, NEW YORK, HORACE G. HOADLEY, OF WATERBURY, CONNECTICUT, AND EVERETT C. LEWIS, OF WOONSOCKET, RHODE ISLAND; SAID WILLIAMS AND LEWIS ASSIGNORS TO SAID HOADLEY.

LEVER AND RATCH ATTACHMENT.

SPECIFICATION forming part of Letters Patent No. 613,950, dated November 8, 1898.

Application filed October 27, 1897. Renewed October 5, 1898. Serial No. 692,768. (No model.)

*To all whom it may concern:*

Be it known that we, HARVEY D. WILLIAMS, residing at Ithaca, in the county of Tompkins and State of New York, HORACE G. HOADLEY, residing at Waterbury, in the county of New Haven and State of Connecticut, and EVERETT C. LEWIS, residing at Woonsocket, in the county of Providence and State of Rhode Island, citizens of the United States, have invented a certain new and useful Improvement in Lever and Ratch Attachments, of which the following is a description, reference being had to the accompanying drawings, wherein—

Figure 1 is a view of the exterior of a mechanism embodying said improvement. Fig. 2 is a view in central lengthwise section of the mechanism shown in Fig. 1 on a plane denoted by the dotted line $x$ with the lever dropped down, so that said section cuts it. Fig. 3 is a view in cross-section of the mechanism shown in Figs. 1 and 2 on the plane denoted by the dotted line $y\,y$. Fig. 4 is a view of the exterior of a mechanism in which the action of the mechanism shown in Figs. 1, 2, and 3 is practically duplicated and made approximately continuous. Fig. 5 is a view of the same mechanism which is shown in Fig. 4 from side A. Fig. 6 is a view of the mechanism which is shown in Figs. 4 and 5 in central vertical section on the plane $z$. Fig. 7 is a detail view, mainly in central lengthwise section, showing a construction in which the operation of the feed-screw and its nut is practically reversed. Fig. 8 is a detail view showing a flatwise view of one of the pawls, together with the appurtenant spring and pin.

The object of the improvement is in general terms to produce the rotary movement of a shaft by means of the vibratory movement of a lever, which vibration may be in various planes, as well as in a plane at right angles to the shaft, which is the ordinary one. Ratchet-drills are a familiar instance where this improvement is applicable.

In the accompanying drawings the letter $a$ denotes a central rotary shaft. In the case of a drill it forms a drill-holder or tool-holder. The letter $b$ denotes a circular ratchet fixedly attached to said rotary shaft and of course thereby made rotary therewith. The letter $c$ denotes a sleeve surrounding said shaft and adapted to rotate thereon. The letter $d$ denotes a pawl or pawls hung in an annular chamber in said sleeve upon pins $e$ and pressed to contact with the ratch by springs $f$, passing wholly or partly around said pins, preferably entirely around said pins.

The letter $g$ denotes a lever (practically an operating-handle) pivotally attached to the sleeve $c$ through the medium of a bifurcation fixedly attached to said lever and taking hold of the trunnions $c'$, which project from said sleeve.

The letter $h$ denotes the feed-screw taking into and through the nut $i$, which by means of an exterior thread is adapted to screw into a suitable chamber in the central rotary shaft. It is desirable in some cases that the outer end of this feed-screw should be enlarged and headed, as is shown in Figs. 1 and 2, and it is also desirable to keep this feed-screw from escaping from its nut undesignedly, to accomplish which end there is provided the flange $k$, screwing, by a threaded pintle attached thereto, to the inner end of said feed-screw. This is a construction which enables said feed-screw to have the enlarged and headed outer end and at the same time prevents that feed-screw from escaping from its nut undesignedly. By giving the lever $g$ a vibratory motion, the plane of which may be one embracing the axis of said central rotary shaft, that shaft is made to rotate when the lever moves in one direction, and the pawls slip backward upon the ratchet-teeth when the lever moves in the other direction. There may be a plurality of these pawls, and in such case it is well to so space the ratchet-teeth that the pawls will engage therewith at different times or intervals, thus to a degree preventing lost motion. It will be understood that a feeding or advancing motion may be given to the central rotary shaft by proper rotation of the feed-screw.

The description so far has applied to what is shown in Figs. 1, 2, and 3 of the drawings. That same description, with the same letters, applies to what is shown in Figs. 4, 5, and 6; but there are other and additional features shown in said Figs. 4, 5, and 6 now to be described, the mechanism of those figures being, as already said, one in which the action of the mechanism as shown in Figs. 1, 2, and 3 is practically duplicated and the operation made approximately continuous.

The letters $l$ and $m$ denote two other sleeves similar to sleeve $c$, surrounding the central rotary shaft and adapted to rotate thereon. The letters $n$ and $o$ denote two other circular ratches similar to ratch $b$, fixedly attached to the central shaft $a$. The letters $p$ and $r$ denote two other pawls or sets of pawls similar to pawls $d$, respectively hung in a similar manner in annular chambers in the respective sleeves $l$ and $m$. The lever $g$ is made to operate these two sleeves, ratches, and sets of pawls through the medium of the bifurcation $s$, which is pivotally hung on said lever and has also a pivotal attachment to a trunnion $l'$ on sleeve $l$ and to trunnion $m'$ on sleeve $m$. The effect of this practically duplicated construction is that the central rotary shaft has advancing rotary motion given to it in both of the vibratory movements of the lever. It is evident that the bifurcation, which as a fixedly-attached part of the lever is brought into connection with the sleeve $c$, might equally as well be brought into connection with the sleeves $l$ and $m$ and the bifurcation which is pivotally attached to the lever be brought into connection with the sleeve $c$.

In Figs. 4, 5, and 6 the feed-screw is shown without the enlarged headed outer end, wherefore it is practicable to make the retaining-flange a part of the feed-screw at its inner end.

In Fig. 7 there is shown a construction for feed purposes which is practically a reversal of that shown in the other figures, wherein the operator rotates the nut $t$ to give the central shaft its feed, such nut taking upon a male thread carried on said central rotary shaft. The letter $u$ denotes a collar interposed between the rear end of the sleeve (which surrounds the central shaft) and the flange $i'$ on the nut $i$, into which the feed-screw takes—this for the purpose of lengthening the feed motion.

As regards the construction shown in Figs. 4, 5, and 6 and having regard only to the actual necessities of the case, it is only necessary that the lever be pivotally attached to two sleeves, (not necessarily three,) that one of these attachments should be through the medium of a bifurcation, (the other intermediate being a non-bifurcated member reaching to a single trunnion,) and that one of the intermediates from the lever to the sleeve be pivotally attached to the lever.

We claim as our improvement—

1. In combination; the central rotary shaft; a sleeve surrounding said shaft and adapted to rotate thereon; the rotary ratch and coöperating pawl or pawls intermediate of said shaft and sleeve; and the lever pivotally attached to said sleeve by trunnions diagonally located with respect to the axis of said sleeve; all substantially as described and for the purposes set forth.

2. In combination; the central rotary shaft; a sleeve surrounding said shaft and adapted to rotate thereon; the rotary ratch and coöperating pawl or pawls intermediate of said shaft and sleeve; the lever pivotally attached to said sleeve by trunnions diagonally located with respect to the axis of said sleeve and the feed-screw with its coöperating nut; all substantially as described and for the purposes set forth.

3. In combination; the central rotary shaft; a plurality of sleeves surrounding said shaft and adapted to rotate thereon; a corresponding plurality of rotary ratches and coöperating pawls or sets of pawls interposed between said shaft and said sleeves; and the lever pivotally attached to a plurality of said sleeves—two of said sleeves being connected by a bifurcation pivotally attached to said sleeves and to the said lever; all substantially as described and for the purposes set forth.

4. In combination; the central rotary shaft carrying the circular ratch on its exterior; an interiorly-chambered sleeve surrounding said shaft; and adapted to rotate thereon; the spring-pressed pawl or pawls pivotally hung to said sleeve within said chamber; and the lever pivotally attached to said sleeve by diagonally-placed trunnions; all substantially as described and for the purposes set forth.

5. In combination; the central rotary shaft; a sleeve surrounding said shaft and adapted to rotate thereon; the ratchet intermediate of said shaft and sleeve; the plurality of pawls arranged in an annular chamber in said sleeve and adapted to engage the ratchet-teeth at separate times or intervals; and the lever pivotally attached to said sleeve by diagonally-placed trunnions; all substanially as described and for the purposes set forth.

6. In combination; the central rotary shaft; a sleeve—containing an internal annular chamber—surrounding said shaft and adapted to rotate thereon; the rotary ratch and coöperating pawl or pawls intermediate of said shaft and sleeve and located within said chamber; and a lever pivotally attached to said sleeve by diagonally-placed trunnions adapted to give rotation to said sleeve; all substantially as described and for the purposes set forth.

HARVEY D. WILLIAMS.
HORACE G. HOADLEY.
EVERETT C. LEWIS.

Witnesses as to said Williams:
JOHN V. CARNEY,
HARRY T. CUSHMAN.
Witnesses as to said Hoadley:
W. E. SIMONDS,
FLORENCE M. BRAGG.
Witnesses as to said Lewis:
CHARLES H. McFEE,
FRANK W. STROUT.